April 28, 1964  V. L. JOHNSON ETAL  3,130,604
DIFFERENTIAL DRIVE
Filed March 18, 1963  2 Sheets-Sheet 1

INVENTORS
VERNIE L. JOHNSON
BY WILLIAM L. JOHNSON
John W. Adams
ATTORNEY

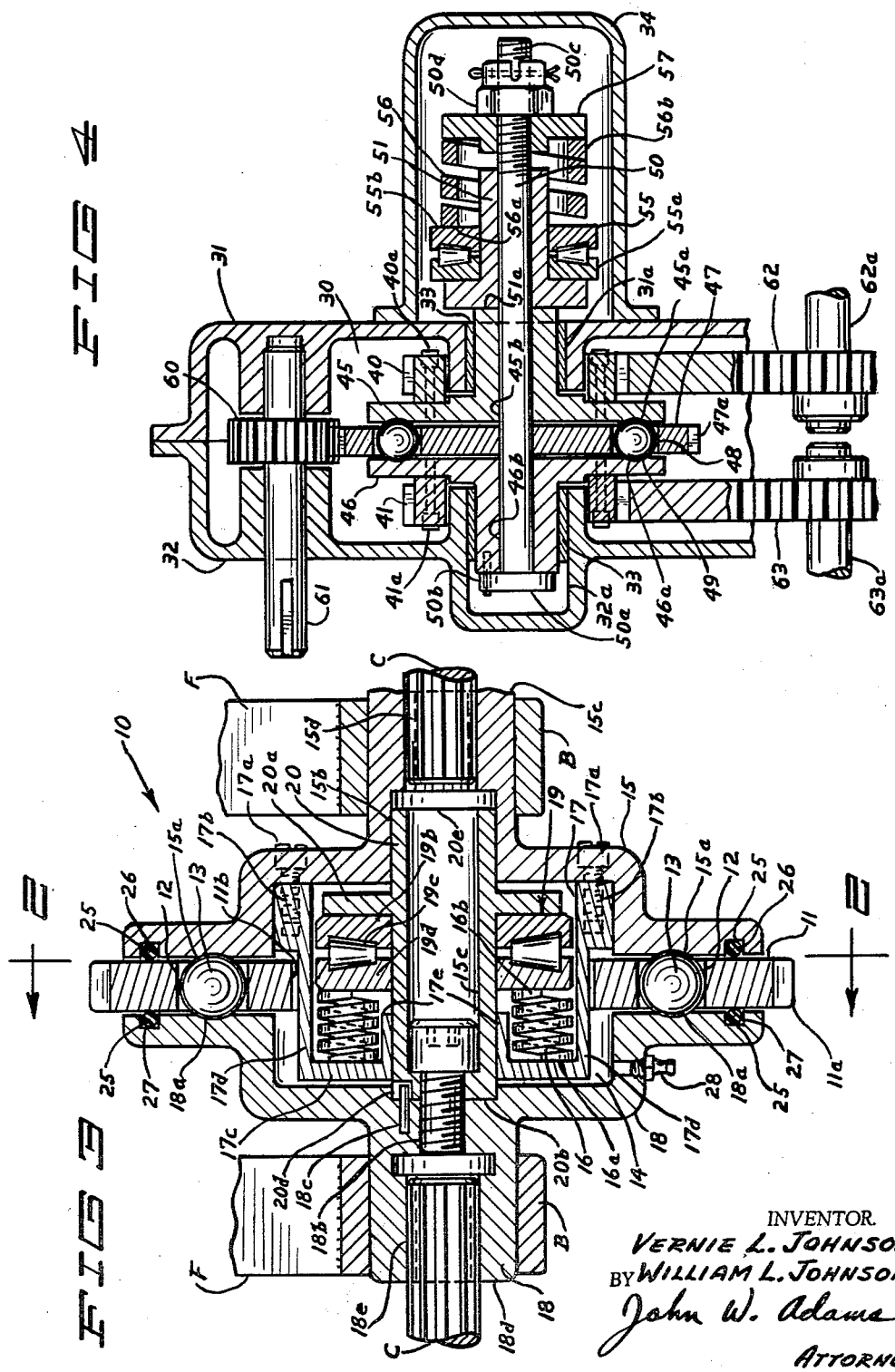

United States Patent Office 3,130,604
Patented Apr. 28, 1964

3,130,604
DIFFERENTIAL DRIVE
Vernie L. Johnson, 228 Harrison St., Anoka, Minn., and William L. Johnson, 1939 Longview Drive, New Brighton, Minn.
Filed Mar. 18, 1963, Ser. No. 265,899
7 Claims. (Cl. 74—650)

This invention relates generally to differential drive mechanisms and more specifically to a differential mechanism which includes a plurality of friction elements carried by a prime mover to transmit rotational power to a pair of driven members.

The general applicability of differential mechanisms has primarily been in substantially large vehicles in which the cost of the differential system does not reflect a large percentage of the vehicle cost. The reason differentials are economically unfeasible for smaller vehicles is that the prime mover and the driven elements usually comprise a geared system which with the combination of gears necessary for the differential operation is, of course, high priced.

The principle of any differential is, of course, to provide means of driving articles, such as the driving wheels of a vehicle, at either the same or at different speeds such that the vehicle may be driven around a corner. Applicants have designed a differential mechanism which eliminates the usual gearing configuration and rather uses a driver which includes a plurality of spherical ball members as the friction elements to drive a pair of power units. The power units are urged together into engagement with the friction elements by a simple biasing means such that engagement pressure is continually exerted on the friction elements and the power units will normally be driven at the same speed thereof, but further allows relative rotation between the power units such that either of the units may be driven at a substantially slower speed such as would occur when the differential is used on a tractor and the tractor is turning a corner. The general construction of applicants' differential will make the use of differentials generally applicable to lower priced vehicles such as small garden tractors and the like, since the uniquely simple construction does not require elements which are high in initial and assembly cost.

It is an object of this invention to provide a differential driving mechanism in which spherical ball members carried by a driver serve as frictional drive elements such that rotary power delivered thereto is distributed to a pair of driven elements and permit relative rotation therebetween such that the driven elements may rotate at substantially different speeds.

It is a specific object of this invention to provide a differential drive mechanism having a pair of driven units driven by a driver wherein the driven units are urged into driving relation with the prime mover element by biasing means to permit relative rotation between the driven units so that one of said driven units may rotate at a speed different from the other element.

It is a further specific object of this invention to provide a pair of driven units driven by a driver and wherein biasing means are arranged to have one end thereof in relation to one of the driven units, and the other end thereof in relation to the other driving unit to urge both of the units against the driver and wherein a bearing member is arranged between the second driven unit and the biasing members such that the driven units may rotate with substantially different speeds but wherein the driving pressure of the driven members is maintained against the driver.

It is a further object of this invention to provide a differential drive mechanism which is a simple, self-contained sealed unit and which may have a large field of applications due to its low cost of production and flexibility of use.

These and other objects and advantages of this invention will more fully appear from the following description made in connection with the accompanying drawings, wherein like reference characters refer to the same or similar parts throughout the views, and in which:

FIG. 3 is a vertical section taken substantially along a center line of the differential; and FIG. 4 is a modified form of the invention.

Figure 1:
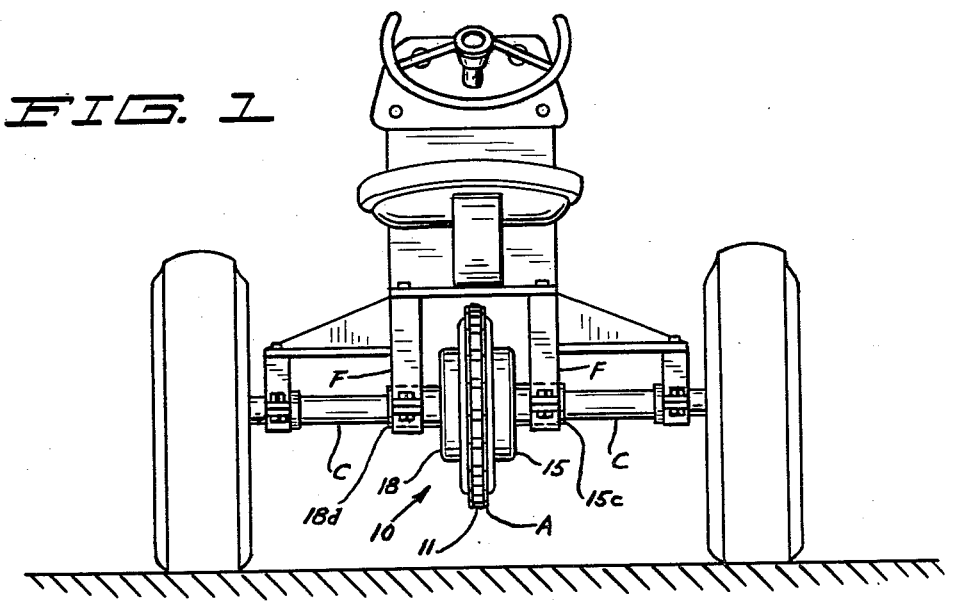
FIG. 1 is a view showing the application of the differential to a small garden tractor.
Figure 2:
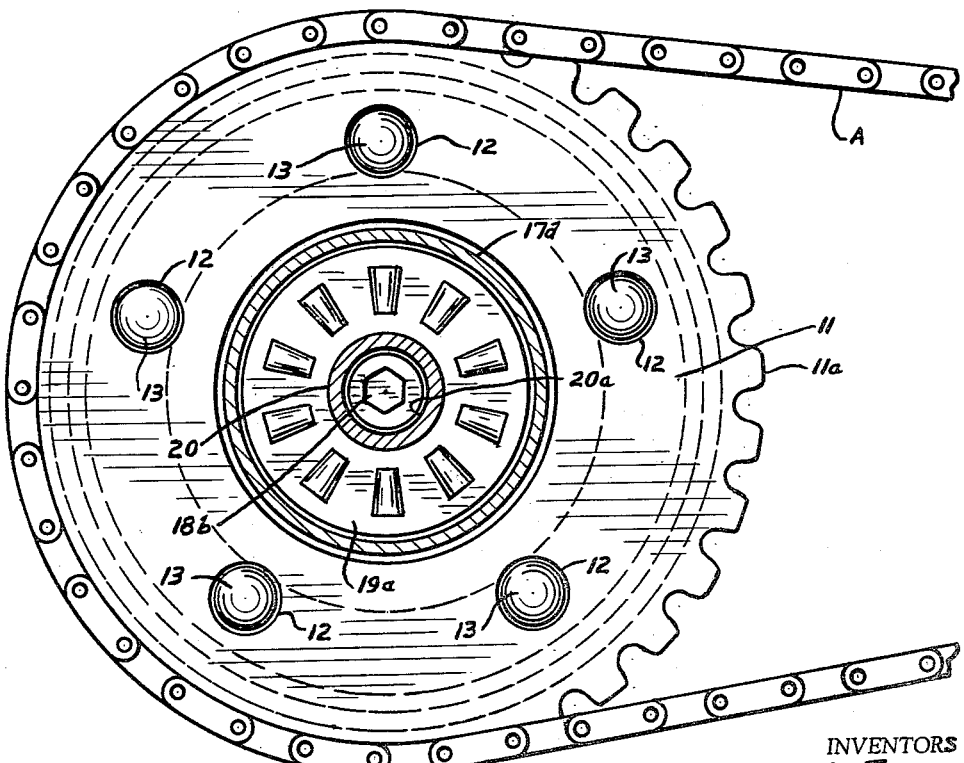
FIG. 2 is a partial section taken substantially along line 2—2 of FIG. 3.

As illustrated in the accompanying drawings, a differential drive mechanism generally designated 10 includes an annular driver plate 11 with driving elements 11a such as chain teeth on the periphery thereof for delivery of rotary power thereto such as by the chain A illustrated. The driver 11 comprises a substantially flat plate member with a plurality of radially spaced passages 12 formed therein each of which is provided with a substantially spherical friction element 13 fitted for free rotation within said passages 12 but being of a diameter slightly greater than the width of the driver plate 11. A pair of driven units 15 and 18 are disposed on either side of said driver plate 11 and are provided with a circumferential ball-receiving groove 15a, 18a to receive the ball elements 13 therein and provide centering means for the driver plate 11 therebetween. The driver units 15 and 18 are designed to provide an opening 14 therebetween at the central portion thereof corresponding to the opening 11b in the annular driver plate 11 such that a biasing and connection mechanism may be located therein which will provide means for urging the drive units 15, 18 into driving engagement with the ball elements 13 of the driver plate 11 and forceably retain the balls 13 therebetween. Generally the mechanism as shown in the drawings may be developed from a thrust bearing with alterations to allow driving the ball retaining cage and transmitting power through the outer races thereof.

As best illustrated in FIG. 3, the biasing and connecting arrangement includes a plurality of compression spring members 16 retained in and spaced about a housing member 17 which is securely connected to one of the drive units 15 as by screws 17a or the like passing therethrough and received in tapped openings 17b of the housing 17. In the form shown, the biasing spring members 16 have one end 16a thereof in abutting relation to the bottom 17c of the said housing 17 and are constrained from lateral movement therein by the side walls 17d, 17e. The other end 16b of the spring biasing members is in abutting relation with one race 19a of a thrust bearing generally designated 19. Thrust bearing 19 is shown to be of the tapered bearing type with rollers 19c between races and wherein the other race 19b is in abutting relation with the shoulder 20a of a power unit centering member 20 which, in the form shown, has one end 20b received into and securely attached to one driven unit 18 as by a cap screw 18b threadedly received into the unit 18 and the pin member 18c which prevents relative rotation of the centering piece 20 to the drive unit 18.

In the form shown the connecting screw 18b is received within a passage 20c of the centering element 20 and the pin member 18c is received into a notched opening 20d on the periphery of the centering unit 20. The bearing abutment element 20a comprises a radially extending flange portion of sufficient radial length such that the bearing 19 may be firmly seated thereon and sufficient pressure may be applied thereagainst. The other end 20e of the centering element 20 is rotatably received into a passage 15b of the drive unit 15 such that the drive unit 15 may be centered thereon and rotate thereabout. It is obvious from this construction the bearing 19 allows relative rotation between the drive unit 18 and the drive unit 15 while both rotate about an axis established by the centering element 20. By providing the bearing 19 of sufficient load bearing strength, it is obvious that the power units 15 and 18 may be urged into driving engagement with the driving elements 13 of the driver plate 11 such that the drive elements 13 will not normally allow relative rotation therebetween and the entire unit will normally be driven at the same speed, but upon application of a sufficient retarding torque on either of the driven units 15 and 18, there may be relative rotation therebetween thus allowing speed differentials to exist between the driven units 15, 18.

In the form shown and as best illustrated in FIG. 3, the outermost ends 15c, 18d of the driven elements 15 and 18 are rotatably mounted in a pair of bearings generally designated B which are secured to the frame F of the vehicle being driven. Axles C for the drive wheels of the vehicle may be received in passages 15d, 18e provided with keyways or other fastening means such that rotary power may be delivered to the axles C.

In the form shown a sealing member 25 is received into grooves 26, 27 respectively on each of the driven units 15, 18 spaced radially from the driving elements 13 of the driver plate 11 such that the entire unit may be sealed against dust or dirt. A grease fitting 28 is threadedly received into either one of the driven units 15 or 18 to allow lubrication of the differential.

In operation of this form of the invention the differential unit 10 is rotatably mounted such as the mounting shown in FIG. 1 and drive means which may be a chain, bevel gear or pulley or similar driving means are provided to drive the outer periphery of the driver plate 11 which, of course, is alterable to receive the driving means provided. Upon rotation thereof of the driver plate 11 and friction elements 13 the driven elements 15 and 18 are normally driven therealong at the same speed due to the force exerted on the balls 13 by the driven elements 15, 18. However, should a resisting torque of sufficient force be applied to either of the driven elements 15, 18 the biasing spring member 16 and bearing 19 will allow relative rotation therebetween by providing the housing unit 17, springs 16 and spring abutting race 19a to rotate as a unit with the driven member 15 and the other race 19b, centering unit 20 and other drive unit 18 to rotate as a separate unit. When such resisting torque is applied to either driven unit the bearing 19 will allow the same to rotate at a slower speed and actually slip on the surface of the friction elements 13 but however as soon as such resisting torque is removed, the friction elements 13 will immediately bring this slower moving unit up to normal speed. This result is accomplished by sufficiently urging the driven units 15, 18 into driving engagement with the friction elements 13 to prevent rotation of the elements 13. It is obvious in this form that the bearing 19 must be of sufficient strength so as to transfer sufficient restraining force to the driving elements 13. Although a tapered bearing 19 is shown, it is obvious this could be replaced with a ball type or other bearing of similar strength.

In a modified form of our invention as shown in FIG. 4 the differential system is arranged within an opening 30 between two housing members designated 31, 32 and is shown arranged with back gearing in the form of spur gears 40 and 41 attached respectively by fastening members 40a, 41a to the driven units 45, 46 which are rotatably mounted in openings 31a, 32a of the housings 31, 32 as by bearings 33 arranged therein. In this form the driver 47 comprises a plate member having spaced openings 48 therein to receive the driving elements 49. As in the preferred form, the driving elements 49 are of slightly greater diameter than the width of the driver plate 47 and are received into concave grooves 45a, 46a of the driven elements 45, 46 for driving the same in the manner as described in the preferred form. To maintain the proper biasing relation between the driven elements 45, 46, a centering shaft 50 is rotatably received within passages 45b, 46b of the driven units and is securely attached to one of the driven units 46 as by an enlarged portion thereof 50a in abutting relation therewith and is pinned thereto against rotation by a pin 50b. The other end 50c is provided with a threaded portion and an adjusting nut member 50d for adjustment of the biasing mechanism. In the modified form shown this biasing mechanism comprises a bearing retaining element 51 with one end 51a thereof in abutting relation with the other driven element 45 and extends longitudinally along the centering rod 50 to locate and center a thrust bearing 55 and biasing member 56 thereon. One race 55a of the thrust bearing 55 is in abutting relation with the centering element 51 and normally rotates therewith. The other race 55b is in abutting relation with one end 56a of the biasing member 56, the other end 56b of which is in abutting relation with an adjustment plate 57 which is positioned along the centering shaft 50 by the adjustment nut 50d. In this modified form it is obvious that one race 55b, the biasing member 56 and the biasing adjustment plate 57 will normally rotate with the centering shaft 50 and attached driven element 46. The other race 55a of the bearing 55 will normally rotate with the centering element 51 and abutting driven element 45. A housing 34 is provided to cover the biasing and adjusting member. To drive this modified form a pinion 60 is in driving connection to gear teeth 47a on the periphery of the driver plate 47 and is driven by any suitable power source through the rotatably mounted shaft 61. The power take-off mechanism in this form comprises a pair of gear members 62, 63 fixed to shafts 62a, 63a and which are in engaging relation with the spur gears 40, 41 respectively attached to the driven elements 45, 46.

The operation of this modified form is substantially the same as that of the preferred form but includes the adjustability of the biasing spring tension to allow adjustment for the load being driven.

It is obvious in either of the forms illustrated that various changes may be easily accomplished to modify the differential with respect to the load to be driven thereby, such as by changing the biasing members or altering pre-load force thereon which, of course, will respectively change the load on the spherical driving elements. It has been found that output power for light applications may be directly taken from the driven elements, but under heavy applications the power should be taken through a back geared configuration as illustrated in FIG. 4. It has been found that higher speed given to the driver plate will greatly increase its effectiveness.

It should be obvious from the above description that the principle of the invention is that of restraining the relative movement of the driving elements on the driven surfaces and further to allow relative rotation between the driven surfaces by providing the unique biasing system connecting the driven elements. It is obvious that we have designed a new and novel differential mechanism in which friction elements cooperate with a driver for driving a differential and that the cost of producing such a differential will be greatly reduced compared to differentials driven in their usual manner which will result in a wider diverse field of application and uses.

It will, of course, be understood that various changes may be made in the form, details, arrangements and proportion of parts without departing from the scope of the invention, which generally stated consists in the matter set forth in the appended claims.

What we claim is:

1. A differential drive mechanism comprising a driver with means for rotating the same, a pair of driven elements respectively disposed on opposite sides of said driver, a plurality of peripherally spaced driving elements carried by said driver for rotation therewith and rotatably mounted on axes disposed radially thereof and being constructed and arranged for simultaneous engagement on opposite sides of said driver with said driven elements and biasing means urging said driven elements into engagement with the rotatable driving elements carried by said driver whereby said driving elements provide the driving connection between the driver and the driven elements while permitting said driven elements to travel at different speeds.

2. The structure as set forth in claim 1 wherein said driving elements comprise substantially spherical ball members.

3. The structure as set forth in claim 2 and said driven elements having annular ball receiving recesses formed in the respective faces thereof adjacent said driver.

4. The structure set forth in claim 1 wherein said biasing means include spring means having the ends thereof respectively arranged in cooperating relation to each of said driven elements, and bearing means interposed between one end of said spring means and the respective driven elements adjacent thereto to allow relative rotation therebetween while urging said driven elements into engagement with said driving elements.

5. The structure set forth in claim 4 and adjustment means for varying the biasing force exerted by said spring.

6. In combination with a wheeled vehicle for driving thereof, a thrust bearing differential mechanism including a pair of bearing surfaces mounted for rotation and adaptable for driving connection to said wheels, a driver, a plurality of peripherally spaced driving elements carried by said driver for simultaneous engagement with said bearing surfaces for driving the same, means for driving said driver, biasing means urging said bearing surfaces into driving engagement with said driving elements and adjustment means to vary the tension on said biasing means to vary the pressure exerted by said bearing surfaces against said driving elements to facilitate driving different loads therewith.

7. In combination with a pair of axle sections, a differential drive mechanism including a pair of spaced apart bearing surfaces mounted for rotation about a longitudinal axis and adaptable for connection to said axles, a driver interposed between said bearing surfaces and provided with a plurality of peripherally spaced driving elements arranged for simultaneous engagement with said bearing surfaces for driving thereof, means for driving said driver, and biasing means urging said bearing surfaces into driving engagement with said driving elements to provide the driving connection therebetween while permitting said bearing surfaces to travel at substantially different speeds.

References Cited in the file of this patent

UNITED STATES PATENTS 2,179,923    De Lavaud _____ Nov. 14, 1939